May 18, 1937.  O. O. DALE  2,080,700
LINE GRIP
Filed Dec. 4, 1935
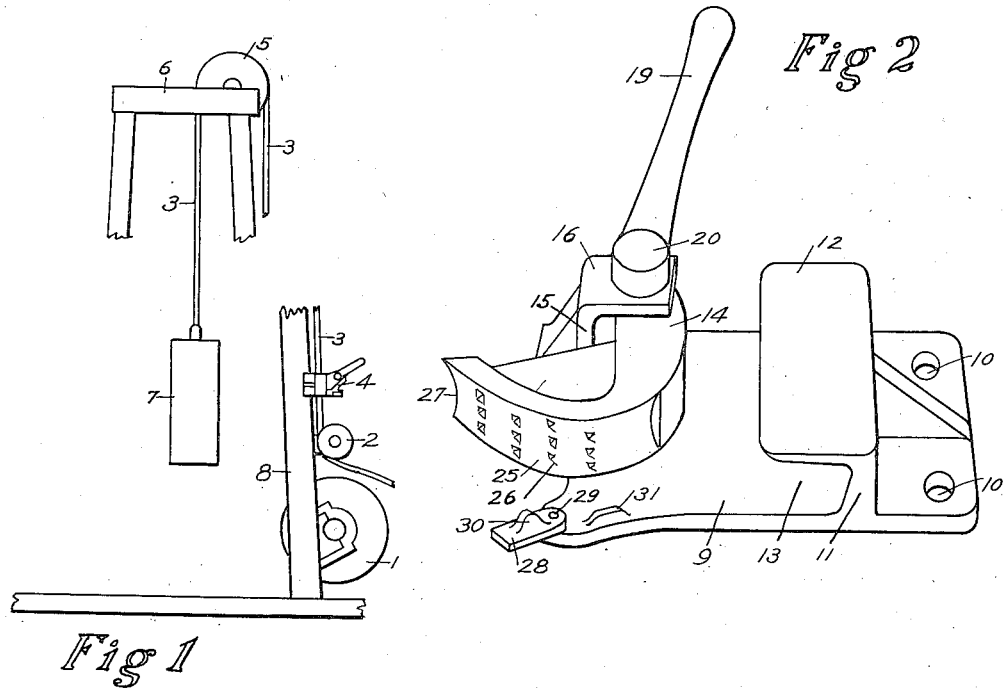
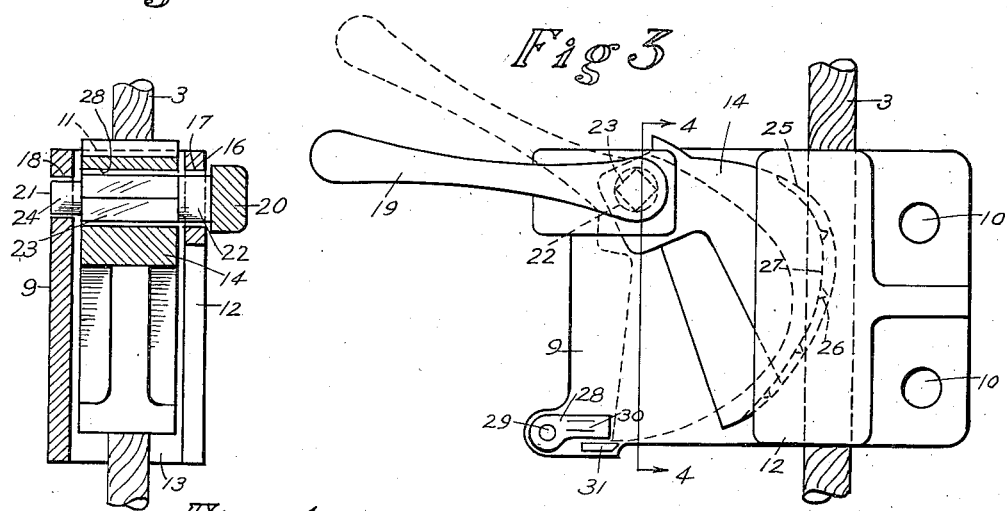
Orie O. Dale
Inventor
By John D. Chesnut
Attorney Patented May 18, 1937

2,080,700

UNITED STATES PATENT OFFICE 2,080,700

LINE GRIP

Orie O. Dale, Long Beach, Calif.

Application December 4, 1935, Serial No. 52,802

3 Claims. (Cl. 24—134)

This invention relates to pivoted cam-wedge line grips for releasably securing a rope or cord, and particularly for holding or gripping the ropes used on oil well hoists and commonly known as "cat-lines".

Oil well rotary draw works or hoists are provided with small hoisting drums called "cat heads". When it is desired to lift or pull some heavy object in the derrick a rope (called the cat-line) is attached to the object. The other end of the line extends up the derrick and over a cat-line sheave and thence downwardly to the cat head, around which it is wrapped in order to provide a lifting or snubbing movement. When it is desired to hold a strain on the cat-line, the line is passed through a releasable clamp or grip attached to the drawworks directly above the cat head.

Such cat-line grips as have been in use heretofore have been large and cumbersome and inconvenient to use. They have had the further disadvantage of necessitating that the line be threaded through the grip in order to place it in or remove it from the grip. Because the cat-lines usually have a knot in the end of the line it is difficult, if not impossible, to thread the line through the grip without untying the knot.

It is an object of the present invention to provide a cat-line grip which is simple in construction and operation, safe under load and easy to operate.

Another object is to provide a grip having a pivoted cam wedge which provides a large degree of wedging action but is easy on the line.

Another object is to provide a grip having a side opening for quick and easy removal and insertion of the line without the necessity of threading the line through the grip.

Another object is to provide releasable latch means for retaining the cam wedge in position to slidably retain the line in the grip.

Another object is to provide a cam lever which serves as a counter balance to hold the cam in a position to permit free running of the line or to hold the cam in the open position for removal or insertion of the line.

Another object is to provide a cat-line grip which can be installed with equal facility on various types of draw works, either wood or steel, or on a jack post.

Other objects and advantages will appear from the following description of a preferred embodiment of the invention.

In the drawing:

Fig. 1 is a fragmentary front elevation of a draw works showing the cat-line grip installed thereon.

Fig. 2 is a front perspective view of the device with the cam in the fully open position.

Fig. 3 is a vertical front elevation of the device with the cam in the line-engaging position.

Fig. 4 is a vertical cross section taken on lines 4—4 of Fig. 3.

Corresponding parts are designated by the same reference numbers in all figures.

Referring to Fig. 1, a draw works is indicated at 1 provided with a cat head 2 which is driven by a counter shaft operated from the draw works shaft, not shown. A cat-line 3 is wrapped around the cat head and extends upwardly through the cat-line grip 4 to a cat-line sheave 5 at the top of the derrick 6 and thence downwardly. A weight 7 is shown attached to the end of the cat-line. The grip 4 is shown in gripping position supporting the weight 7 on the cat-line 3.

The line grip 4 is adapted to be attached to the derrick or draw works in any one of several ways, such as by being bolted or welded to the headboards or jack post. In Fig. 1 the line grip is shown bolted to one of the uprights 8 of the draw works frame.

The line grip 4 comprises a bracket in the form of a flat plate 9 having holes 10 for attaching it to a draw works, etc. The plate 9 is provided with an outwardly extending wall 11 having a flange 12 parallel to the face of plate 9 and forming a line-receiving recess 13. Opposite the entrance to recess 13 is a cam wedge 14 supported from a bracket formed by a wall 15 which extends outwardly from plate 9 and has a flange 16 parallel to the face of plate 9. The flange 16 is provided with a circular hole 17. The plate 9 is provided with a circular hole 18, preferably of smaller diameter than the hole 17 and in axial alignment therewith. The cam wedge 14 is supported and actuated by a lever consisting of a handle 19 having a head 20, and a pintle 21 extending out from said head and at a right angle to said handle. Pintle 21 is preferably formed with a circular portion adjacent the head 20 of somewhat smaller diameter than the head so as to form a shoulder 22 which serves to prevent axial movement of the pintle in one direction. The portion 22 of the pintle is of somewhat smaller diameter than the hole 17 so as to provide a loose fit therein. The middle portion of pintle 21 is preferably formed with a square or other irregular surface 23. The cam wedge 14 is provided with an opening 24 of similar square or other irregular surface adapted to receive the portion 23 of the pintle with a snug fit. The end portion of pintle 21 is formed with a circular cross section 24 somewhat smaller than the hole 18 so as to fit loosely therein. The end of the pintle 21 is peened over to retain the pintle in place in the bracket.

The cam wedge 14 consists of a metal block having a substantially semi-circular cam face 25. The cam face is provided with studs or teeth 26 adapted to grip the line 3 to prevent slippage. The cam face 25 is preferably curved in cross section as shown at 27 to conform substantially to the curvature of the line 3, thus increasing the gripping area between the line and cam face.

The hole 24 in the cam wedge is located eccentric to the cam face 25 and is preferably near the upper end of the cam wedge. The holes 17 and 18 in the pintle bracket are located near the upper corner of plate 9 opposite the recess 13 and at a distance from the wall 11 such that the cam face 25, when in its uppermost or extreme wedging position, is a short distance away from the wall 11. Thus the cam wedge will have sufficient take-up to grip tightly on a worn or mashed line, but will not cut the line or crush it excessively against the wall 11.

The handle 19 is so proportioned and positioned angularly with respect to the weight of the cam wedge 19 and the location of the pintle 21 that when the wedge is released it will swing toward the position shown in Fig. 2. Likewise, when the wedge is in the fully open position shown in Fig. 2 the weight of the handle 9 will hold it in that position. When the wedge is in this position the cam face 25 is spaced from the flange 12 a distance sufficient to permit the line 3 to be placed in or removed from the recess 13 without the necessity of threading the line through the grip.

When the grip is in use the line 3 is often allowed to run freely through the recess 13 with the wedge 14 hanging in the released position. In order to prevent the wedge from going to the fully open position shown in Fig. 2, which would allow the rope to escape from the grip, there is provided a latch comprising an arm 28 pivoted at one end to the plate 9. The pivot pin is indicated at 29. The arm 28 is provided with a projecting lug 30 which serves as a handle. The plate 9 is provided with a stop lug 31 adapted to releasably hold the latch 28 in the horizontal position shown in Fig. 3. The latch 28 is so positioned with respect to the lower edge of the cam wedge 14 that when the cam wedge rests against the end of latch 28 the cam face 25 is in the released position with respect to the line 3 but the curved edge of the cam does not come entirely out of the recess past the edge of the flange 12. Thus the line 3 although loose, can not get out of the grip. There are no teeth on the upper portion of the cam face 25, so that when the wedge is against the latch 28 that portion of the wedge which is closest to the line 3 (the upper portion of the wedge) is smooth so as not to damage the line when it is running freely through the grip.

It is to be understood that the foregoing description covers the preferred embodiment of the invention and that the design may be varied as to details while still coming within the scope of the claims.

I claim:

1. A line grip comprising a bracket plate, a cam wedge pivotally attached to said bracket plate, an operating lever for said cam wedge, a wall on said bracket plate against which the line is adapted to bear, a flange on said wall substantially parallel to said plate, said plate, wall and flange forming a line-receiving recess open toward said cam wedge, said cam wedge being adapted to wedge the line against said wall, a releasable latch for said cam wedge mounted on said bracket plate and having operative and inoperative positions, said latch in operative position being adapted to prevent said cam wedge from moving out of a semi-released position whereby the line can run freely through said recess but cannot escape therefrom, and in inoperative position permitting unobstructed pivotal movement of said cam wedge whereby the line can be inserted into or removed from said recess from one side thereof.

2. A line grip comprising a bracket plate, a cam wedge pivotally attached to said bracket plate, an operating lever for said cam wedge, a wall on said bracket plate against which the line is adapted to bear, a flange on said wall substantially parallel to said plate, said plate, wall and flange forming a line-receiving recess open toward said cam wedge and adapted to receive said cam wedge therein, said cam wedge being adapted to wedge the line against said wall, teeth on the lower portion of the cam face, adapted to engage the line when said cam wedge is in the line-gripping position, a smooth face on the upper portion of said cam face, a releasable latch for said cam wedge mounted on said bracket plate and having operative and inoperative positions, said latch in operative position being adapted to prevent said cam wedge from moving out of a semi-released position whereby the line can run freely through said recess but cannot escape therefrom and the smooth portion of said cam face is adjacent the line but out of wedging contact therewith, and in inoperative position permitting unobstructed pivotal movement of said cam wedge, whereby the line can be inserted or removed from said recess from one side thereof.

3. A line grip comprising a bracket plate, a cam wedge pivotally attached to said bracket plate, an operating lever for said cam wedge, a wall on said bracket plate against which the line is adapted to bear, a flange on said wall substantially parallel to said plate, said plate, wall and flange forming a line-receiving recess open toward said cam wedge and adapted to receive said cam wedge therein, said cam wedge being adapted to wedge the line against the wall, a releasable latch for said cam wedge mounted on said bracket plate and having operative and inoperative positions, said latch in operative position being adapted to prevent said cam wedge from moving out of a semi-released position whereby the line can run freely through said recess but cannot escape therefrom, and in inoperative position permitting unobstructed pivotal movement of said cam wedge whereby the line can be inserted into or removed from said recess from one side thereof, said lever and said cam wedge including cooperating means whereby when said wedge is released said wedge will swing from camming position to semi-released position with said latch in operative position, or to fully open position with said latch in inoperative position.

ORIE O. DALE.